May 17, 1938.  D. H. MONTGOMERY ET AL  2,118,015
INDEXING STATION TYPE MACHINE
Filed Sept. 11, 1935   5 Sheets-Sheet 1

INVENTORS
DONALD H. MONTGOMERY
ARTHUR H. JOBERT
BY
ATTORNEYS

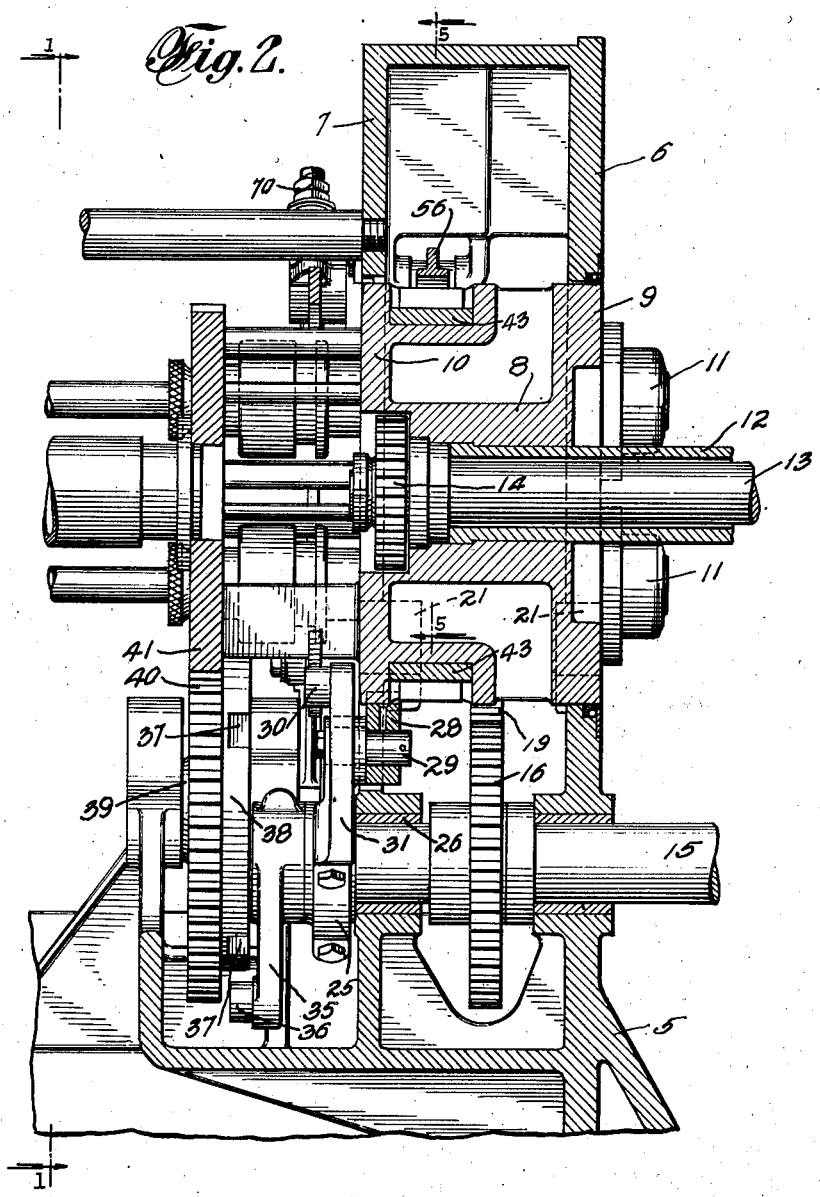

May 17, 1938.　　D. H. MONTGOMERY ET AL　　2,118,015
INDEXING STATION TYPE MACHINE
Filed Sept. 11, 1935　　5 Sheets-Sheet 3
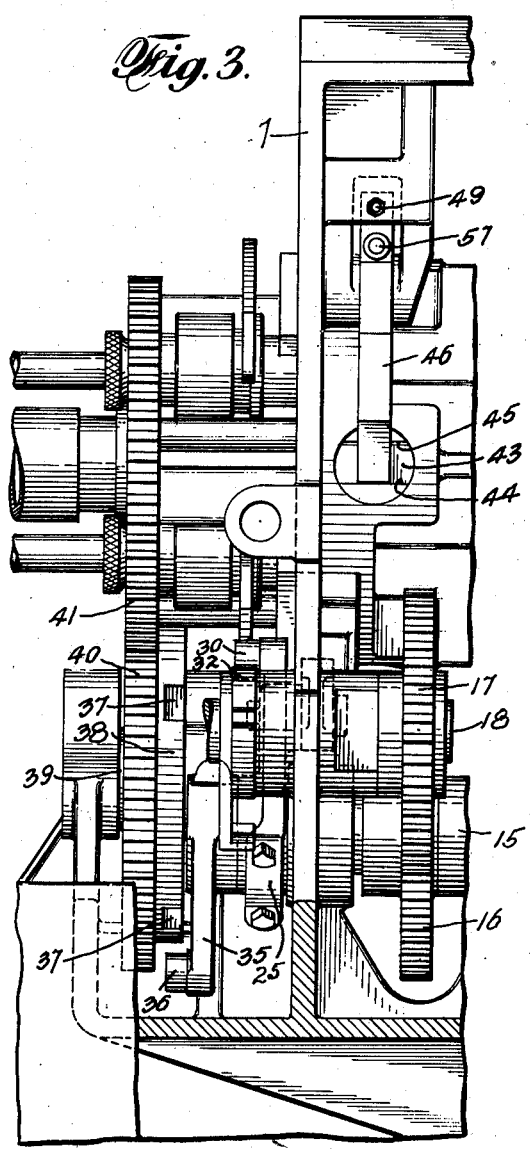
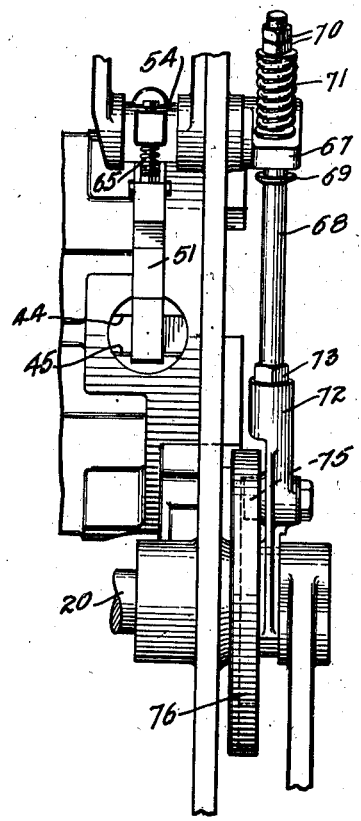
INVENTORS
DONALD H. MONTGOMERY
ARTHUR H. JOBERT
BY
ATTORNEYS May 17, 1938.　　D. H. MONTGOMERY ET AL　　2,118,015
INDEXING STATION TYPE MACHINE
Filed Sept. 11, 1935　　5 Sheets-Sheet 4

INVENTORS
DONALD H. MONTGOMERY
ARTHUR H. JOBERT
BY
ATTORNEYS

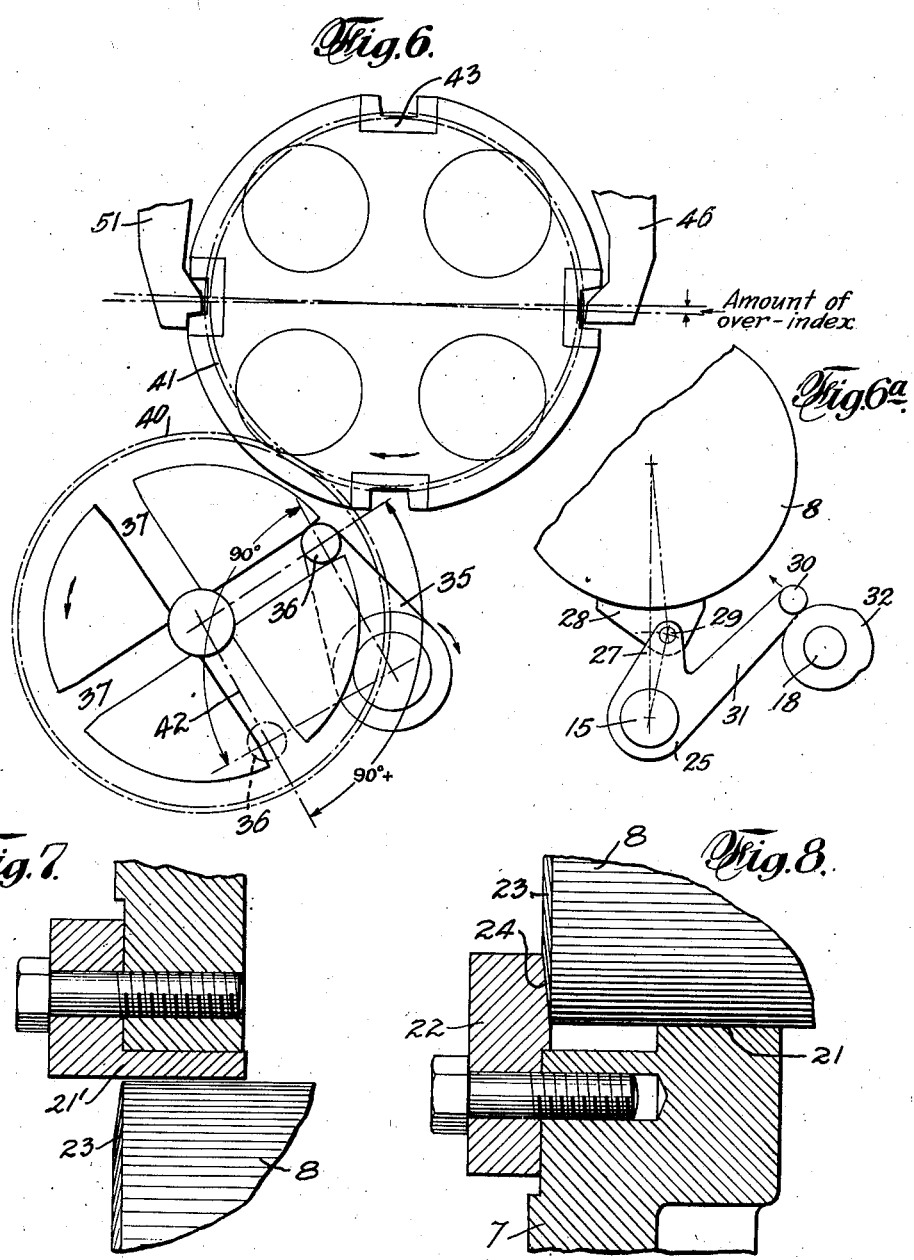

Patented May 17, 1938

2,118,015

UNITED STATES PATENT OFFICE 2,118,015

INDEXING STATION TYPE MACHINE

Donald H. Montgomery, Berlin, and Arthur H. Jobert, New Britain, Conn., assignors, by mesne assignments, to The New Britain Machine Company, New Britain, Conn., a corporation of Connecticut Application September 11, 1935, Serial No. 40,075

18 Claims. (Cl. 29—37)

Our invention relates to an indexing station type machine such as a multiple spindle bar machine or chucking machine and more specifically to certain features of improvement in indexing, locking of the indexible carrier, and means for prevention of wear and, in general, to various features of improvement in a machine of the character indicated.

The invention will be described as embodied in a machine of the type disclosed in Gridley et al. application, Serial No. 551,136, filed July 16, 1931. The said Gridley et al. application discloses a four-spindle indexing station type machine and involves a frame for supporting an indexible spindle carrier, together with a spring saddle device for resiliently raising the spindle carrier during indexing. Locking means serve to hold the spindle carrier in position between indexing movements. A stem extends from the spindle carrier to the power or gear case end of the machine where a bearing journals the stem and sustains the end thrusts of the spindle carrier. The stem carries a Gridley type of tool slide and forming and cut off tools are mounted on the frame. Certain features of the present invention are in the nature of improvements on the machine disclosed in said Gridley et al. application.

It is an object of the present invention to provide improved means for raising an indexible carrier during indexing movements thereof.

It is a further object to provide for moving an indexible carrier out of bearing supporting engagement with both the axial and radial supporting means during indexing of the carrier whereby to avoid wear of the coacting surfaces between the indexible carrier and the supporting means.

It is another object to provide improved means for very securely locking an indexible carrier in indexed position.

It is a further object to provide improved indexing and carrier locking means which will operate without the noise usually attendant upon indexing and/or locking of an indexible carrier.

It is a further object to provide indexing and locking means for an indexible carrier, so arranged as to assure certainty of coaction of parts.

Another object is to provide a machine of the character indicated having improved features of simple, yet sturdy, construction, which operate with great effectiveness and with a minimum of wear and, in general, the object is to provide various features of improvement in a machine of the character indicated.

Other objects and features of invention will be hereinafter set forth or will become apparent to those skilled in the art.

Briefly stated, in a preferred form of the invention we provide a carrier such as a spindle carrier, together with indexing means such as a slotted index wheel and index arm. We employ improved means preferably acting positively in timed relation with the indexing mechanism to raise the indexible carrier out of bearing supporting engagement with supports of the frame during indexing movements of the indexible carrier. The indexible carrier is locked in indexed position by locating and locking means acting on opposed abutments on the indexible carrier and the carrier locking means is so constructed and related to the indexing mechanism that the latter may be arranged for slightly overindexing the carrier, whereby to allow free and easy movement of the carrier locating and locking means into position and movement of at least a part of the locating or locking means to slightly back index the carrier and lock the same in properly indexed position. The indexible carrier is supported radially by the frame and axially by end supporting pad means on the frame, the construction being such that when the indexible carrier is raised during indexing, it is freed from both the radial and axial bearing supporting surfaces of the frame so as to avoid wear of the coacting surfaces and thus indefinitely maintain the accuracy of positioning of the carrier on the frame.

In the drawings which show, for illustrative purposes only, a preferred form of the invention as embodied in a four-spindle bar machine—

Fig. 2 is a sectional view taken substantially in the plane of the line 2—2 of Fig. 1;

Fig. 3 is a sectional view taken substantially in the plane of the line 3—3 of Fig. 1;

Fig. 4 is a fragmentary sectional view taken substantially in the plane of the line 4—4 of Fig. 1;

Fig. 6 is a more or less diagrammatic or illustrative view of the spindle carrier, together with its indexing and locking means;

Figure 1:
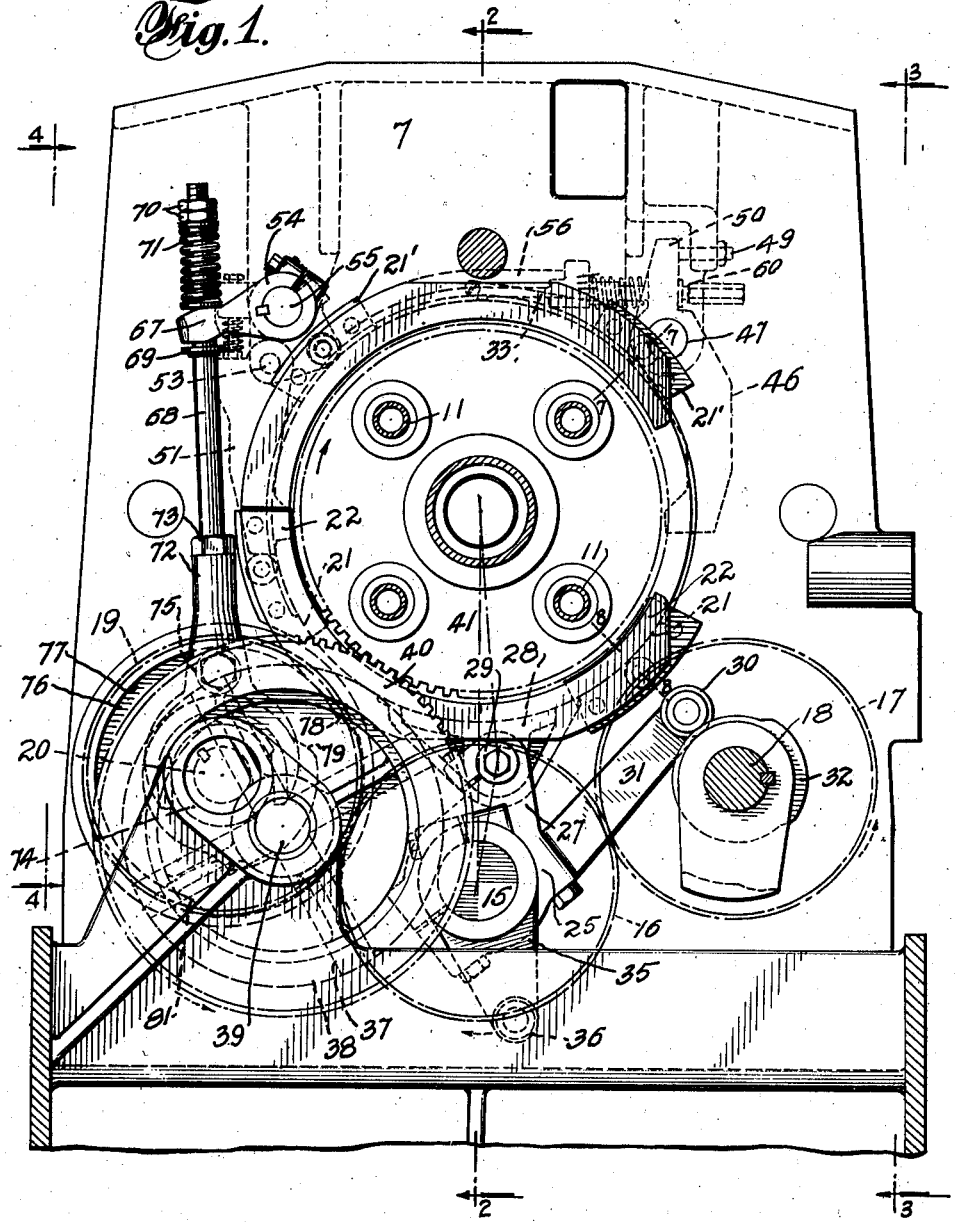
Fig. 1 is a sectional view taken substantially in the plane of the line 1—1 of Fig. 2 and showing the rear end of the spindle carrier and frame to illustrate various features of invention.

Fig. 6ª is a view similar to Fig. 6 but illustrating the spindle carrier raising means;

Fig. 7 is an enlarged fragmentary view of a detail taken substantially in the plane of the line 7—7 of Fig. 1;

Fig. 8 is a similar view taken substantially in the plane of the line 8—8 of Fig. 1.

In said drawings, 5 indicates generally the frame of a machine which at the indexible carrier end includes what may be termed a front wall 6 and a rear wall 7, provided with an enlarged bore for the reception of the indexible carrier 8, which includes a circumferentially continuous front portion 9 and similar rear portion 10, which, between indexing movements, are adapted to be supported by the walls 6—7 of the frame as will be later described. The spindle carrier is smaller than the bore through the walls 6—7 so as to permit raising of the spindle carrier, as will be described. The spindle carrier in the preferred form illustrated carries four rotatable spindles 11—11 which are indexed with the carrier from station to station for the purpose of permitting the performance of tooling operations on bars or blanks carried in chucks of the spindles. Extending from the carrier 8 toward the right or power case end of the machine is a stem 12 which may be journaled in the power case end of the machine and which itself forms a bearing for a Gridley type of tool slide carrying end working tools, as will be understood, and as is more fully disclosed in said Gridley et al. application, Serial No. 551,136. The spindles are driven by a central drive shaft 13 extending through the stem 12 and provided with a gear 14 meshing with spindle drive gears (not shown).

Since the present invention relates to various features having to do with the spindle carrier, only the spindle carrier end of the machine has been illustrated. A main cam shaft 15 extends from the power case end of the machine to the spindle carrier end and serves as the primary drive for the various features to be referred to in connection with a description of the invention. The cam shaft 15 carries a gear 16 which meshes with a gear 17 carried on an auxiliary stub cam shaft 18. The gear 16 meshes also with a second gear 19 carried by an auxiliary or stub shaft 20. The gears 16—17 and 19 are of the same size so that the shafts 18—20 rotate at the same speeds as the main cam shaft 15.

The spindle carrier 8 between indexing movements is supported radially on the frame as by means of spaced frame pads or bearing supporting surfaces 21—21 which may be spaced apart circumferentially and be engaged by the lower circumferential portion of the indexible carrier. Such radial bearing supports on the frame are preferably provided on both the front wall 6 and the rear wall 7 of the frame and, as stated, the openings through the walls are larger than the spindle carrier so that the latter may be moved upwardly and out of bearing supporting engagement with the frame supports 21—21. The spindle carrier is supported axially between indexing movements by axial supporting means, such as pads 22—22 (Fig. 8) secured to the rear wall 7 of the frame and positioned to engage the rear disk 10 of the indexible carrier. The rear face of the carrier disk 10 is preferably tapered or beveled, as indicated at 23, and the axial supporting surface of the pads 22 is preferably tapered or beveled as indicated at 24, to accurately fit the surface 23 of the indexible carrier when the latter is supported radially by the frame supports 21—21. Thus, when the spindle carrier is down on the frame pads 21—21, it will be securely supported in a radial direction thereby and will be securely supported axially by the axial frame supports or pads 22. The surfaces 23—24 are beveled as indicated so that when the indexible carrier is raised to free its surface from the radial pads 21—21, the surfaces 23—24 will also be disengaged from each other and, as will be later described, the spindle carrier is indexed while it is out of bearing supporting engagement with its radial and axial supporting pads last described. It may be here stated that when the spindle carrier is raised out of engagement with the frame parts 21—22, the stem 12 having a bearing in the power case end of the machine may act to support the spindle carrier axially during indexing.

Figure 5:
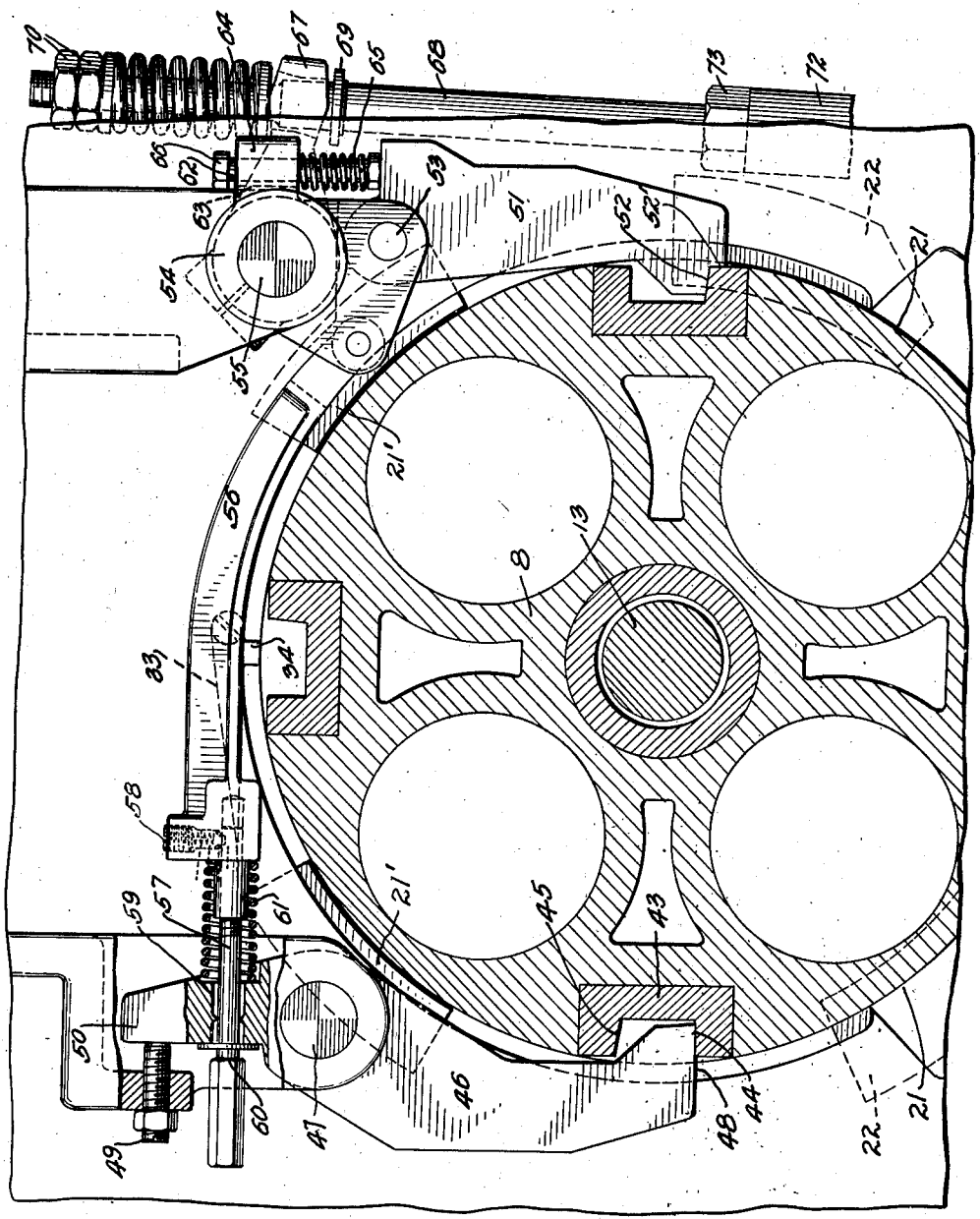
Fig. 5 is an enlarged sectional view taken substantially in the plane of the line 5—5 of Fig. 2.

We have provided means for positively raising the spindle carrier during indexing movements. In the form shown (Figs. 1, 2, 6ª), we provide a lifting lever 25 which is oscillatably mounted upon the frame as on the sleeve 26 which supports the main cam shaft 15 in the rear wall of the frame. The lever 25 has an upstanding arm 27 which is pivoted to a shoe 28 engaging beneath the spindle carrier. The pivotal connection between the lever arm 27 and the shoe 28 preferably comprises a pin 29 eccentrically formed relatively to its bearing bore in the lever arm 27 and rigidly secured therein as by means of a split bearing and take-up bolt. Thus, by shifting the position of the pin 29, the relative height of the shoe 28 on the lever arm 27, may be slightly varied. The lifting lever 25 is provided with a cam roll 30 on an arm 31. The cam roll 30 is in a position to be engaged by a cam 32 on the auxiliary cam shaft 18. In the position shown in the drawings, the cam roll 30 is on an extended depressed dwell portion of the cam 32 and consequently the shoe 28 will be in its lowermost position, as will be understood. When the cam shaft 18 rotates so as to cause the high portion of cam 32 to engage beneath the roll, the lifting lever 25 will be rocked and through the toggle action between the lever arm 27 and lifting shoe the latter will be raised and will consequently raise the spindle carrier out of bearing supporting engagement with the frame at 21—21. We preferably provide slide shoes 21'—21' fixed to the frame and positioned to limit the upward movement of carrier 8 and to steady the same when supported on the shoe 28 during indexing. The extent to which the spindle carrier is raised by the mechanism disclosed may be indicated by a pointer 33 pivoted to the frame and having a lug 34 resting on the spindle carrier so that when the spindle carrier is raised the lug will serve to rock the lever 33 and its pointer will multiply and indicate the motion or extent of rise of the spindle carrier. The desired rise of the spindle carrier may be indicated by marks on the frame (Figs. 1 and 5) so that it may always be readily determined whether or not the spindle carrier is being properly raised and, if not, the parts may be adjusted to cause the desired rise.

The carrier is indexed by means of an index arm 35 carrying the roll 36 to engage the slots 37 of the slotted disk 38, the latter being mounted upon a stub shaft or stud 39 carried by the frame. Rigidly secured to the indexing disk 38 is a gear 40, which meshes with a gear 41 rigidly carried by the indexible carrier or a rearward extension thereof. Thus, when the index arm 35 is rotated by the main cam shaft 15, it engages the slots 37 successively and indexes the gear 40 which in turn indexes the indexible carrier, as will be understood. The timing of indexing and spindle carrier raising means is such that the spindle carrier is raised just prior to the indexing movement.

In order to assist in the operation of locking the spindle carrier in indexed position and to facilitate quiet engagement of the carrier locking means with the carrier, we have so arranged the indexing mechanism that the spindle carrier is not indexed exactly 90 degrees (in a four-spindle machine) but is indexed less or preferably more as by being slightly overindexed upon each indexing movement and, as will be later described, the spindle carrier is then back indexed the slight amount of the overindex by the spindle carrier locking mechanism, which moves the spindle carrier the slight amount required and locks the same in place.

In the illustrative diagrammatic view of Fig. 6, it will be noted that the index roll 36 has completed the indexing movement of the index disk and is about to leave one of the slots 37. The spindle carrier has been indexed to the position shown which is a slightly overindexed position. When in that position the locating and locking means are positioned, as will be later described, and after the index roll 36 has left the slot 37, the carrier is back indexed the small amount of the overindex and locked in position. The dotted line position 36 of the index roll relatively to the adjacent slot 37 indicates also the amount of the overindex. By the time the index roll 36 has rotated clockwise from its present full line position around to position to engage the next slot 37, that is, into the dotted line position of the index roll 36, the index plate will have been back indexed by the carrier and the meshing gears 40—41 so that the slot 37 will be not in the position shown but in position to permit the free entry of the index roll 36. The method of effecting the slight overindex of the carrier consists merely in moving the correct center for the index disk downwardly along the line 42 a small amount. It will be clear that, with the parts positioned as shown in Fig. 6, if the rotative center of the index disk were moved upwardly, the sides of the lower slot would become tangent to the dotted line position of the index roll 36. Consequently, movement downward will cause the index roll 36 to slightly overindex the index disk and consequently the carrier. It will be noted, however, that the index roll 36 leaves each slot in a truly radial direction since by the time the index roll has rotated into position to engage the next slot that slot will have been back indexed a sufficient amount so as to cause the roll to enter it in a truly radial direction. Therefore, all of the benefits of having the index roll enter and leave the slots in truly radial direction are retained and yet a slight overindex is accomplished. The principal reason for the overindex as described is to facilitate and insure the proper positioning of the locking mechanism relatively to the carrier.

We have devised a very simple, yet powerful, locating and locking mechanism for the carrier. In the form shown the carrier is provided with equidistant locking blocks 43, each provided with abutment surfaces 44—45. A locating lever 46 is pivoted on a stud 47 carried by the rear wall 7 of the frame. The locating lever 46 is provided with a bearing surface 48 to fit and engage the surface 44 so as to accurately locate and determine the clockwise positioning of the carrier. The surfaces 44—48 when coacting preferably lie in a plane at right angles to a plane through the pivotal axis of the locating lever 46. The inward movement of the lever 46 may be limited by means of an adjustable stop 49 carried by the frame and positioned to be engaged by the ear 50 on the lever 46. A locking lever 51 is positioned opposite to the locating lever 46 and is provided at the lower end with an abutment surface 52 to engage the inclined surface 45 and the coacting surfaces are preferably of the same inclination and engage each other flatwise when the parts are in the locked position illustrated. The locking lever 51 is carried at its upper end by a pivot pin 53 carried by a toggle block 54 pivoted to the frame on a stud 55. Pivotally secured to the toggle block 54 is a connecting link 56 extending over the top of the carrier and provided with an adjustable pin 57 which may be threaded into the end of the link 56 and secured in adjusted position as by means of a set screw 58. The pin 57 passes loosely through an opening 59 in the ear 50 and is provided at its outer end with a head 60 so that upon movement of the link 56 toward the right, the head will serve to rock the rotating lever 46 in a clockwise direction (Fig. 5) and withdraw the nose from the locking slot of the block 43. The locating lever 46 is urged into locking position as by means of a spring 61 interposed between the ear 50 and the end of the connecting link 56. Thus, as the link 56 is moved toward the left, the locating lever 46 is rocked in a counterclockwise direction and should the lever by chance engage any obstacle, no damage would be done since the spring 61 would merely be compressed. However, when the link 56 is moved toward the right, the head 60 of the pin 57 directly engaging the ear 50 will positively rock the lever 46 in a clockwise direction and withdraw the nose of the lever from the block 43.

The locking lever 51 as above stated is pivotally mounted at 53 on the toggle block 54. A bolt or pin 62, similar to the pin 57, is adjustably mounted in the top of the lever 51 and passes loosely through an opening 63 in an ear 64 of the toggle block. Means such as a spring 65 interposed between the ear 64 and the offset portion of the lever 51 serves to urge the latter into its locking position (Fig. 6) with the stop portion 52' in engagement with the block 43. The head 66 in the pin 62 in position to be engaged directly by the ear 64 when the toggle block is rocked in a counterclockwise direction, will serve to positively withdraw the lever 51 from its locked position. Thus, both levers are positively withdrawn from locking position and both are urged in the locking direction by resilient means and should either lever encounter an obstruction there is little likelihood of damage since the urging springs would simply be compressed and since those springs are not relied upon as the locking force for the spindle carrier, they may be very light and only sufficient to move the levers properly.

As indicated above, both the levers 46 and 51 are actuated by the toggle block 54. The latter is itself cam actuated in timed relation to the other functions of the machine. In the form shown, the toggle block is provided with a lever arm 67 apertured to permit passage of the actuating rod 68 which is provided with a fixed abutment 69 at the lower side of the lever 67 and is provided with an adjustable means such as a nut and lock nut 70 at the top. Between the adjustable means 70 and the top of the lever 67 is interposed a heavy spring 71 which may be said to be a locking spring. When the rod 68 is moved upwardly it will be clear that the fixed head 69 engaging beneath the arm 67 will positively rock the toggle and positive rocking of the latter will positively withdraw the two levers 46—61 as has been described. The rod 68 at its lower end is screw threaded or otherwise adjustably secured in a cam follower member 72 and held in adjusted position as by means of a lock nut 73. The lower end of the cam follower member 72 is preferably forked so as to fit over the hub 74 of a cam member 76. Such hub and fork serve merely to guide the rod 68 in its up and down movement and to permit the slight oscillation thereof incident to the rocking of the toggle block. The cam follower member is actuated by cam means and in the form shown the follower member is provided with a cam roll 75 which is engaged by cam surfaces on a cam member 76 mounted on the auxiliary stub cam shaft 20 and driven by the gear 19, as heretofore described. In the position shown in Figs. 1 and 2 the cam roll 75 is engaged by the long low dwell portion 77 of the cam and the draw rod 68 is consequently held in its lowermost position and the toggle block and levers 46—51 are holding the carrier in locked position. When the cam 76 rotates until the cam roller is free from the dwell portion 77 of the cam, the roller may roll up the rise portion 78 and the spring 71 will raise the rod until the abutment 69 strikes the arm 67. Thereafter the roll will be engaged by inner cam face 79 and the rod will then be positively raised so as to again rock the toggle block and positively withdraw the levers 46—51 and free the indexible carrier. The rod 68 is maintained in raised position by the dwell portion of the cam 79 while the spindle carrier is raised and indexed as heretofore described. As the indexing is completed the outer face 81 of the drawback portion of the cam engages the roll and draws the rod 68 downwardly thus bringing the locking levers into locking position. As heretofore stated, the slight overindex is to assure a free entry of the locating lever 51 and locking lever 46 in the locking blocks (Fig. 6). When the locking lever 46 descends under the influence of the toggle it forces the spindle carrier in a clockwise direction (Fig. 6) until the nose 43 of the locating lever is engaged by the abutment surface 44 (Fig. 5), after which any further descent of the lever 46 serves to lock the spindle carrier to the frame when the spindle carrier lifting means eases the carrier down. The small back rotation of the spindle carrier by the locking lever 46, we term back indexing. When the spindle carrier has been back indexed as described the toggle block 54 and locking levers can move no further and continued downward movement of the rod by the cam face 81 serves to compress the spring 71 and insure the positive locking of the carrier in indexed position while the roll 75 rides on the dwell portion 77 of the cam.

The spindle carrier raising mechanism, indexing mechanism, and locking mechanism are arranged to act in accurately timed sequence so that the operation of the machine will be smooth, accurate and silent, and there is little likelihood of any of the parts jamming or becoming broken. As stated above, the index roll enters and leaves the index slots in truly normal direction so that at the time of entering and leaving the indexible carrier has been stopped. The timing is preferably such that while the index roll is just entering the index slot the carrier locking mechanism releases the carrier and the carrier raising mechanism acts to raise the carrier. Thus, when the carrier is free to rotate the index roll is already in position to take hold and there is no possibility of a failure of the parts to coact. Similarly, while the index roll is still in partial engagement with the index slot just prior to leaving it, the carrier locking arms are moved into place (Fig. 6) so that there is no possibility of a failure of engagement of the locking mechanism to engage by reason of any rotative movement of the carrier after the index roll leaves the index slot. The carrier locking mechanism and carrier raising mechanism are preferably timed so that the carrier is gently lowered onto its seating surfaces just ahead of the final locking by the carrier locking mechanism.

It should be noted that with the carrier raised out of engagement with its frame supports both radial and axial during the indexing movements there is no wear on such supports nor on the coacting surfaces of the indexible carrier. Consequently the accuracy of the machine will be maintained indefinitely. Since the spindle carrier raising mechanism, as well as locking mechanism, are under cam control, the movements of the parts are controlled and all parts are eased into and out of place so that the operation of the machine is substantially silent. The carrier raising means and the locking means are toggle actuated with great yet accurately controllable force.

While the various features of carrier raising, indexing and locking all cooperate to produce an improved machine and improved function of various features relating to the spindle carrier, it is to be understood that some of the features herein disclosed may be used without others and that various modifications and changes may be made within the scope of the invention as defined in the appended claims.

We claim:

1. In a machine of the character indicated, a frame, an indexible carrier, means for indexing the same, supporting means for said carrier between indexing movements thereof, and means for moving said carrier transversely of its axis of indexing out of engagement with said supporting means during indexing movement thereof, and withdrawing said last mentioned means to permit said carrier to return to said supporting means by gravity.

2. In a machine of the character indicated, a frame, an indexible carrier, means for indexing the same, said frame having a carrier supporting surface, means for clamping said carrier in engagement with said supporting surface between indexing movements of said carrier, and means for positively raising said carrier out of engagement with said carrier supporting surface during indexing movements thereof, said last mentioned means being movable to permit said carrier to return to said supporting means by gravity.

3. In a machine of the character indicated, an indexible carrier, means for indexing the same, means for lifting said carrier out of engagement with said frame during indexing movement of said carrier, said lifting means including an eccentric pin whereby upon rotative adjustment of said eccentric pin the limits of movement of said carrier may be adjusted.

4. In a machine of the character indicated, an indexible carrier, means for indexing the same, means for moving said carrier out of engagement with said frame during indexing movement thereof, and a multiplying visual indicator for indicating the extent of movement of said carrier.

5. In a machine of the character indicated, a frame having spaced apart walls, each of said walls having a carrier supporting surface thereon, an indexible carrier, means for clamping said indexible carrier between indexing movements thereof into engagement with said carrier supporting surfaces on said spaced apart walls, and means for positively moving said carrier out of engagement with said supporting surfaces during indexing movements of said carrier.

6. In a machine of the character indicated, a frame, an indexible carrier, said frame having a bearing supporting surface for supporting said carrier in a radial direction, and a supporting surface for supporting said carrier in an axial direction, and means for moving said carrier out of engagement with both of said supporting surfaces during indexing movements of said carrier, and means for clamping said carrier in engagement with both of said supporting surfaces between indexing movements of said carrier.

7. In a machine of the character indicated, a frame, an indexible carrier, means for indexing said carrier, said frame having a tapered seating surface for said carrier for sustaining the same axially between indexing movements thereof, said frame having a second seating surface for sustaining said carrier radially between indexing movements of said carrier, and means for moving said carrier during indexing movements thereof out of engagement with both of said seating surfaces.

8. In a machine of the character indicated, a frame, an indexible carrier, means for indexing the same, said carrier and frame having interfitting tapered surfaces engageable with each other for sustaining said carrier against axial movement between indexing movements thereof, said frame having a second seating surface for sustaining said carrier radially between indexing movements of said carrier, and means for moving said tapered surfaces relatively to each other out of engagement with each other and said carrier and second seating surface out of engagement with each other during indexing movements of said carrier.

9. In a machine of the character indicated, a frame, an indexible carrier having opposed locking abutments, means for indexing said carrier, a locking lever pivoted on said frame and movable radially into and out of locating relationship to one of said locking abutments in each indexed position, a second locking lever, a toggle member, means for connecting said toggle member to said locking levers, and means for actuating said toggle member for causing said second locking lever to engage its opposed abutment and rotatably move said carrier to cause engagement between said first locking lever and adjacent locking abutment and to cause both said locking levers to lock said carrier in indexed position.

10. In a machine of the character indicated, a frame, an indexible carrier, indexing means for indexibly moving said carrier, said carrier having opposed locking abutments in each indexed position thereof, a locating lever for engagement with one of said locking abutments, resilient means for urging said locating lever into locating position with its locking abutment, and positive means for withdrawing said locating lever from locking position, a locking lever for engagement with the other of said opposed locking abutments, resilient means for urging said locking lever into locking position relatively to its abutment, and positive means for positively withdrawing said locking lever from locking position, means for operatively connecting said locking and locating levers for synchronized action, and means for moving said locking lever while said locating lever is held stationary in locating position, whereby to lock said carrier in position determined by said locating lever.

11. In a machine of the character indicated, an indexible carrier, locating and locking means therefor comprising a locating lever pivotally mounted on said frame, a toggle member pivotally mounted on said frame, a locking member pivotally mounted on said toggle member, a connecting link between said toggle member and said locating lever and including a positive connection between said locating lever and said connecting link for positively moving said locating lever to withdrawn position, and resilient means for urging said locating lever into locating position, means for swinging said locking lever about its pivot on said toggle member and including a spring for urging said locking lever in locking direction, and a member for positively withdrawing said locking lever to unlocked position upon movement of said toggle member, and cam means acting in timed relation with means for indexing said carrier for moving said toggle member, for the purpose described.

12. In the combination defined in claim 11, said cam means for moving said toggle member including means for positively moving said toggle member to positively move said locating and locking levers to unlocked position, and resilient means for urging said toggle member into position to permit said locating and locking levers to be urged into locking position relatively to said carrier.

13. In the combination defined in claim 11, said cam means for moving said toggle member including means for positively moving said toggle member to positively move said locating and locking levers to unlocked position and resilient means for urging said toggle member into position to permit said locating and locking levers to be urged into locking position relatively to said carrier, and means for adjusting the stress of said resilient means for urging said toggle member as aforesaid.

14. In a machine of the character indicated, a frame, an indexible carrier, means for indexing the same, two locking means for said carrier engageable therewith at opposite sides thereof, resilient means for urging said locking means into locking position relatively to said carrier, and cam means for withdrawing both said locking means from locking position and also controlling the movement of said locking means into locking position under the influence of said resilient means.

15. In a machine of the character indicated, a frame, an indexible carrier, means for indexing the same, locking means for said carrier for locking the same in indexed position, said locking means including a swinging member to move into and out of locking relationship with said carrier, and means for bodily moving said swinging member after the same has been swung to locking relationship as aforesaid to lock said carrier in indexed position.

16. In a machine of the character indicated, a frame, an indexible carrier, means for indexing the same, carrier locating means, carrier locking means for said carrier and including a toggle for moving at least a part of said locking means in locking direction to urge said carrier rotatively into engagement with said locating means.

17. In a machine of the character indicated, a frame, an indexible carrier, locking means for said carrier comprising a pair of swinging arms, and toggle means for bodily moving one of said arms in carrier locking direction after the same has been swung to locking position.

18. In a machine of the character indicated, a frame, an indexible carrier, means for indexing the same, means for moving said carrier out of engagement with said frame during indexing movement thereof, carrier locking means, said indexing means and carrier locking means being timed to cause said locking means to be moved into position to prevent rotation of said carrier before said carrier is freed from its indexing means, and means for moving said locking means in turret locking direction in timed relationship with said means for moving said carrier out of engagement with said frame.

DONALD H. MONTGOMERY.
ARTHUR H. JOBERT.